(12) United States Patent
Holland

(10) Patent No.: US 8,676,700 B2
(45) Date of Patent: Mar. 18, 2014

(54) METHODS AND SYSTEMS FOR HANDLING CURRENCY

(75) Inventor: Daniel Holland, Verona, NJ (US)

(73) Assignee: Depositslips LLC, Cedar Grove, NJ (US)

( * ) Notice: Subject to any disclaimer, the term of this patent is extended or adjusted under 35 U.S.C. 154(b) by 30 days.

(21) Appl. No.: 13/429,751

(22) Filed: Mar. 26, 2012

(65) Prior Publication Data

US 2013/0254098 A1 Sep. 26, 2013

(51) Int. Cl.
*G06Q 40/00* (2012.01)

(52) U.S. Cl.
USPC ............................. 705/39; 705/42; 235/379

(58) Field of Classification Search
USPC ...................... 705/42, 39; 235/379
See application file for complete search history.

(56) References Cited

U.S. PATENT DOCUMENTS

| | | | |
|---|---|---|---|
| 5,978,780 A | 11/1999 | Watson | |
| 7,114,649 B2 * | 10/2006 | Nelson et al. | 235/379 |
| 7,246,741 B2 | 7/2007 | Cable et al. | |
| 7,881,996 B1 | 2/2011 | Schulz | |
| 7,882,031 B2 | 2/2011 | Song et al. | |
| 2003/0233319 A1 | 12/2003 | Lawrence | |
| 2005/0038748 A1 | 2/2005 | Latimer et al. | |
| 2005/0071268 A1 | 3/2005 | Riddett, Jr. | |
| 2005/0108164 A1 * | 5/2005 | Salafia et al. | 705/42 |
| 2007/0063016 A1 | 3/2007 | Myatt et al. | |

* cited by examiner

*Primary Examiner* — Samica L Norman
(74) *Attorney, Agent, or Firm* — Jon Fallon

(57) ABSTRACT

A bulk deposit can be made at a financial institution based on dealings between a remitter and the remitter's agent. Information concerning transactions between the agent and the agent's customers, is transferred by the agent to the remitter and, in turn, from the remitter to a service provider that is distinct from the agent, the remitter, and the remitter's bank. The service provider can generate a deposit slip and store in a database, information about the slip. This deposit slip is marked with (a) transaction amounts for the agent's customers, (b) the bulk cash to be deposited; and (c) a summary of any discrepancy between the two. The provider makes available to the financial institution at least some of the transaction information including (a) its correlation to the deposit slip, and (b) detail greater than that produced on the deposit slip.

12 Claims, 14 Drawing Sheets

LMT Bulk Deposit Slip

Date:
Authorization# 1003ws71510 — M7

| Sender ID# | Amount | |
|---|---|---|
| 1058 | $ | 1,000.00 |
| 300 | $ | 350.00 |
| 2870 | $ | 1,102.00 |
| 1136 | $ | 70.27 |
| 1136 | $ | 21,081.09 |
| 2429 | $ | 275.00 |
| 673 | $ | 440.00 |
| 90 | $ | 220.00 |
| | | |
| | | |
| | | |
| | | |
| | | |
| | | |
| | | |
| | | |
| Total Received | $ | 24,538.36 |
| Total Deposited | $ | 25,000.00 |
| Over/Under | $ | 461.64 |

M1, M2 → Sender ID / Amount rows
M4, M5, M6 → totals

LMT Name
Address
Agent # 1003-WS
Routing # — M3

Total Received
Total Deposit
Over/Under
Account# xy3457-19447 — M8

FIG. 2

Select Bank Account and Date Range

Bank Account [0372723123 ▼] [0372723123 ▼] Date Range [6/15/2010 ▼] [6/25/2010 ▼] Dollar Range [$0.00 ▼] [Maximum ▼]

52

Portfolio
○ Bank Account - 0372723123
Transaction History          Deposit Summary 6/15/2010 to 6/25/2010

| Deposit Date | Deposit Amount | |
|---|---|---|
| 6/15/2010 | $58,000.00 | Deposit Details |
| 6/16/2010 | $58,000.00 | Deposit Details |
| 6/20/2010 | $60,023.43 | Deposit Details |
| 6/23/2010 | $58,000.00 | Deposit Details |
| 6/24/2010 | $58,000.00 | Deposit Details |
| 6/25/2010 | $56,200.70 | Deposit Details |

Deposit - Agent Summary
Total Deposit $60,623.43

Portfolio
○ Bank Account - 0372723123
  Transaction History

Show All Deposits

Deposit Detail 6/20/2010

| Agent | Agent Deposit | Agent Received | Deposit Authorization | Over/Under | Details |
|---|---|---|---|---|---|
| 1003-WS | $2,700.00 | $2,626.00 | 1003ws62010 | $74.00 | Agent Deposit Details |
| 1009-TE | $1,000.00 | $690.00 | 1009te62010 | $310.00 | Agent Deposit Details |
| 1011-VM | $9,000.00 | $9,005.00 | 1011vm62010 | ($5.00) | Agent Deposit Details |
| 1013-EC | $100.00 | $100.00 | 1013ec62010 |  | Agent Deposit Details |
| 0001-SF | $23,000.00 | $23,064.07 | 0001sf62010 | ($64.07) | Agent Deposit Details |
| 0001-MP | $25,000.00 | $24,538.36 | 0001mp62010 | $464.64 | Agent Deposit Details |
| Grand Totals | $60,800.00 | $60,023.43 |  | $776.57 |  |

FIG. 5

Deposit - Agent Details

| Agent | Agent Deposit | Agent Received | Sender Amount | Sender Name | Receiver Name |
|---|---|---|---|---|---|
| 0001-MP | $ 25,000.00 | $ 24,538.36 | $ 200.00 | Telma Olivera | Telma olivera Santos |
| Authorization 001mp62010 | | | $ 440.00 | Vanilson Valentin De Aquino | Maria Aparecida De Souza Aquino |
| | | | $ 275.00 | Silvano Soares Texera | Shirley Leni Cruz Texeria |
| | | | $ 21,081.09 | Sergio Joaquin Da Cruz | Sergio Joaquin Da Cruz |
| | | | $ 70.27 | Sergio Joaquin Da Cruz | Lino Severo Follman |
| | | | $ 1,102.00 | Marcos Roberto Da Cruz Machado | Maria Odete Da Cruz |
| | | | $ 350.00 | Adailson De Souza Pereira | Nizla Aparecida Da Silva |
| | | | $ 1,000.00 | Ilgma Borges De Paula | Maria Eugenia De Paula |
| | | | $ 24,518.36 | | |

FIG. 6

| Agent | License | Invoice | Issued | Time | Amount | Sender SysID | Sender Name | Sender ID Type | Sender ID | Sender DOB | Sender Address | Sender City | Sender State | Sender Zip |
|---|---|---|---|---|---|---|---|---|---|---|---|---|---|---|
| 0001-MP | 58583 | 25627 | 6/20/2010 | 10:43:00 | $ 220.00 | 90 | Thelma Oliveria | | | | 327 Morris Ave. | Elizabeth | NJ | 7205 |
| 0001-MP | 58583 | 25631 | 6/20/2010 | 11:06:00 | $ 440.00 | 673 | Vanilson Valentin De Aquino | | | | 347 Elm St. | Newark | NJ | 7105 |
| 0001-MP | 58583 | 25633 | 6/20/2010 | 11:25:00 | $ 275.00 | 2429 | Silvano Soares Texeira | | | | 178 Elm St. 3FL. | Newark | NJ | 7105 |
| 0001-MP | 58583 | 25636 | 6/20/2010 | 11:37:00 | $ 21,081.09 | 1136 | Sergio Jaquim Da Cruz | Passport | YA085740 | 8/18/1972 | 144 Ferry St. | Newark | NJ | 7105 |
| 0001-MP | 58583 | 25636 | 6/20/2010 | 11:41:00 | $ 70.27 | 1136 | Sergio Jaquim Da Cruz | Passport | YA085740 | 8/18/1972 | 144 Ferry St. | Newark | NJ | 7105 |
| 0001-MP | 58583 | 25637 | 6/20/2010 | 11:57:00 | $ 1,102.00 | 2870 | Marcos Roberto Da Cruz | Drivers License | M 230 585 744 822 | 10/25/1970 | 94 Mt. Pleasant St. | Newark | NJ | 7104 |
| 0001-MP | 58583 | 25640 | 6/20/2010 | 12:39:00 | $ 350.00 | 300 | Adailsom De Souza Pereira | US Government ID | 2423185431 | 9/16/1973 | 155 Murry St. | Newark | NJ | 7105 |
| 0001-MP | 58583 | 25641 | 6/20/2010 | 12:43:00 | $ 1,000.00 | 1058 | Ilgma Borges De Paula | | | | 106 Silver Spring | Short Hills | NJ | 7078 |
| | | | | | $ 24,538.36 | | | | | | | | | |

FIG. 7A

| Sender Phone | Receiver SyID | Receiver Name | Receiver ID | Receiver Address | Receiver City | Receiver State | Receiver Country | Receiver Phone | Bank Name | Bank Branch | Acct. Type | Acct. Number |
|---|---|---|---|---|---|---|---|---|---|---|---|---|
| 908-220-7260 | 102 | Tania Olivera Santos | 386.440.026-00 | | Itabuna | BA | Brazil | | Banco O Brasil | 3445-2 | CH | 574720 |
| 973-350-4804 | 928 | Maria Aparecida | 003.535.216-71 | | Itabirinha | MG | Brazil | 3335264067 | Banco O Brasil | 2147-4 | CH | 879741 |
| 973-855-0328 | 4069 | Shirley Leni Cruz Teixeria | 74310952615 | | Contagem | MG | Brazil | | Caixa Economica Federal | 893 | SA | 18741-5 |
| 973-359-2543 | 1864 | Sergio Joaquim Da Cruz | 181.539.158-86 | | Jales | SP | Brazil | | Banco O Brasil | 0411-1 | CH | 2181562 |
| 973-588-5198 | 1643 | Lino Severo Follman | 674.844.329-91 | | San Paulo | SP | Brazil | | Banco O Brasil | 2815-0 | CH | 174368 |
| 973-747-7159 | 4901 | Maria Aodete Da Cruz | 075.093.919-20 | | Faxinal | PR | Brazil | | Banco O Brasil | 2056-7 | SA | 2917451 |
| 973-643-1286 | 5349 | Nilza Aparecida Da Silva | 035.177.126.65 | | Valadares | MG | Brazil | 5327 | Banco Ita USA | 3041 | SA | 130932541 |
| 973-376-5040 | 5103 | Maria Eugenia De Paula | 661.436.406.53 | | Belo Horizonte | MG | Brazil | 3232345488 | Banco O Brasil | 2592-5 | SA | 25011452 |

FIG. 7B

Sender Details - Deposits over $3,000.00

| Agent | Sender ID | Sender Amount | Sender Name | Sender ID Type | Sender ID | DOB |
|---|---|---|---|---|---|---|
| 1011-VM | 2912 | $ 5,000.00 | Christine Reis | Valid Passport | CK-158009 | 3/18/1983 |
| 0001-SF | 1855 | $ 5,000.00 | Demylson Geraldo Mangelo Alves | Drivers License | 1308835 | 6/9/1967 |
|  | 571 | $ 6,522.00 | Franciaco Sydulovicz | Drivers License | S 0341 261 001 007 | 1/2/1970 |
|  | 300 | $ 4,900.00 | Adailson De Souza Pereira | US Government ID | 2423185431 | 9/16/1973 |
|  |  | $ 16,422.00 |  |  |  |  |

Figure 8

Sender Details - Deposits over $10,000.00

| Agent | Sender ID | Sender Amount | Sender Name | Sender ID Type | Sender ID | DOB |
|---|---|---|---|---|---|---|
| 1011-VM | 1136 | $ 21,081.09 | Sergio Joaquim Da Cruz | Valid Passport | YA085740 | 8/18/1972 |

Figure 9

| Agent 0001-SF Deposit Authorization Screen ||||||
|---|---|---|---|---|---|
| To Be Deposited || Date: |||
| Yes | No || Amount | Sender ID | Sender Name |
| Yes ||| $ 220.00 | 90 | TELMA OLIVEIRA |
| Yes ||| $ 440.00 | 673 | VANILSON VALENTIN DE AQUINO |
|| No || $ 100.00 | 1444 | GILMAR BENTO FIDELIS |
|| No || $ 2,200.00 | 2969 | BRUNO VENANCIO DA SILVA |
| Yes ||| $ 275.00 | 2429 | SILVANO SOARES TEIXEIRA |
| Yes ||| $ 21,081.09 | 1136 | SERGIO JOAQUIM DA CRUZ |
| Yes ||| $ 70.27 | 1136 | SERGIO JOAQUIM DA CRUZ |
|| No || $ 5,000.00 | 2912 | CRISTIANE REIS |
|| No || $ 120.00 | 3214 | ELIANE DE OLIVEIRA PAULINO |
|| No || $ 110.00 | 1630 | EDER FRANCISCO PINTO |
| Yes ||| $ 1,102.00 | 2870 | MARCOS ROBERTO DA CRUZ MACHADO |
| Yes ||| $ 350.00 | 300 | ADAILSON DE SOUZA PEREIRA |
| Yes ||| $ 1,000.00 | 1058 | ILGMA BORGES DE PAULA |
|| No || $ 275.00 | 2930 | EMILIO DELFINO DOS SANTOS |
|| No || $ 500.00 | 3065 | RONAN VIEIRA |
|| No || $ 39.00 | 119 | JOSE GARCIAS LINOS FERREIRA |
|| No || $ 300.00 | 1898 | GIANE INACIO DA SILVA |
| Total Received ||| $ 24,538.36 |||

```
Acknowledgement

I have reviewed the transactions and the activity
to be attached to the depositslip for deposit
meets the compliance standards establised by our
company and the transactions comply with all applicable
state and federal laws to the best of my knowledge

[ Accept ]        [ Don't Accept ]
```

FIGURE 12

| Amount | Sender ID | Name | Government Issued ID | | CTR | | SAR | |
|---|---|---|---|---|---|---|---|---|
| | | | At Remitter | Processor File (Click to View) | At Remitter | Processor File (Click to View) | At Remitter | Processor File (Click to View) |
| $ 5,000.00 | 2912 | CRISTIANE REIS | X | X | | | | |
| $ 5,000.00 | 1855 | DEMYLSON GERALDO MANGELO ALVES | X | | X | | | |
| $ 6,522.00 | 571 | FRANCISCO SYDULOVICZ | X | | X | | | |
| $ 4,900.00 | 300 | ADAILSON DE SOUZA PEREIRA | X | | X | | | |
| $ 21,081.09 | 1136 | SERGIO JOAQUIM DA CRUZ | | | | | | |
| $ 3,500.00 | 1315 | EDMILTON BORGES DOS SANTOS | X | X | | X | | X |
| $ 11,000.00 | 595 | ISABEL CRUZ | | | | | | |
| $ 12,000.00 | 2875 | GIRLEI SEBASTIAO MADUREIRA CAMELO | X | | X | X | X | X |
| $ 3,500.00 | 571 | FRANCISCO SYDULOVICZ | X | X | X | X | X | X |
| $ 4,800.00 | 2869 | MARIA PEREIRA BRANDAO | X | X | X | | | |
| $ 5,000.00 | 218 | WANDERLEY COSTA | X | | X | | | |
| $ 4,200.00 | 300 | ADAILSON DE SOUZA PEREIRA | X | | | | | |
| $ 11,000.00 | 119 | JOSE GARCIAS LINOS FERREIRA | | | | X | X | X |
| $ 19,000.00 | 1898 | GIANE INAGIO DA SILVA | | | | X | X | X |

METHODS AND SYSTEMS FOR HANDLING CURRENCY

BACKGROUND OF THE INVENTION

1. Field of the Invention

The present invention relates to bulk cash, and in particular, to the banking systems, money remitters, and the tracking of bulk cash to its origin. In addition, the present invention relates to deposit slips. Moreover, the present invention relates to processes for sharing information and methods for tracking a remitter's activity.

2. Description of Related Art

A wire transfer is a system for sending money from one location to another via an electronic format. Wire transfers have existed for over 140 years as a way to safely and securely send money. It can be considered one of the oldest industries in the U.S. It began in 1871 when Western Union, one of the original 11 stocks included in the first Dow Jones Average, introduced it as a service. Western Union then began providing service to Europe, North Africa, North and South America, Australia and Asia in 1896.

A Money Remitter is a business entity that operates through a network of agents that are collecting cash on behalf of their customers with the goal of sending it to the customer's beneficiary. The collection of cash from the customer is part of what is herein referred to as a "transaction". The Remitter's agent takes each individual's remittance and combines it together with the other individuals' remittances to make one cash deposit in the bank. Grouping multiple transactions into one deposit creates cost efficiency. This accumulating of multiple cash transactions into one amount is referred to as "bulk cash." A Remitter's agent creates bulk cash and periodically to brings it to a bank.

The money remitter industry has grown steadily, with the last 20 years bringing double digit growth year over year. However, the events of Sep. 11, 2001 have changed the way regulators look at foreign money transfers.

In the past few years, governments worldwide have established several new policies to prevent improper use of financial institutions by criminals and terrorists. A number of businesses, such as money services businesses (MSB), travel agencies, jewelry stores, pawnshops, etc., have to comply with regulatory rules and requirements for the purpose of preventing fraud, money laundering, and terrorist financing.

According to the USA PATRIOT Act, financial institutions and money service businesses must authenticate the identity of an individual before executing any transaction for that individual. Under the PATRIOT ACT, banks have had a difficult time complying with the new laws imposed upon them. Banks have gone to great lengths to institute policies and programs that will ensure compliance with the law.

The implementation of the PATRIOT ACT placed far greater scrutiny on the banking industry's requirements to implement effective BSA (Bank Secrecy Act) programs and turned compliance into an industry all its own. For the last decade, banks have worked diligently to increase their compliance departments' ability to keep up with fraudulent and criminal acts that have been made possible by new technologies.

The relevant laws and regulations include a Know Your Customer (KYC) requirement. In addition, as part of a Money Service Business (MSB) KYC policy MSB's are also expected to effectively Know Your Customer's Customer (KYCC). However, it is extremely difficult to not only know your customer's activity, but to know your customer's customers activity when it involves cash and only limited information is available.

U.S. Bank regulators such as Federal Reserve Bank (FRB), Federal Deposit Insurance Corporation (FDIC), Office of Comptroller of Currency (OCC), and Office of Thrift Supervision (OTS) issued a joint statement, confirming that a financial institution has to file a Suspicious Activity Report (SAR) if the financial institution knows that its customer has violated any law.

Also, financial institutions and money service businesses must comply with the requirements of the Office of Foreign Assets Control (OFAC), prohibiting business activities with any entity on the blacklist periodically published by the OFAC. Moreover, under the Bank Secrecy Act, financial institutions and money service businesses are required to file a Currency Transaction Report (CTR) if transactions by a customer exceed $10,000 in cash on the same day. They must also file a Suspicious Activity Report (SAR) for any suspicious activity, including structured activities that attempt to avoid the filing of a CTR.

The increased importance of a bank's compliance department in implementing BSA laws and effective Know Your Customer policies has made it increasingly difficult for banks and Money Service Business's (MSB's) to work together. The result has been a decade long string of account closings and lost business relationships.

Special problems have arisen with a specific type of MSB referred to as Money Remitters. A money remitter, herein referred to as a remitter, is someone who specializes in wire transfers. When it comes to remitters, banks have found it easier to close the remitters' accounts rather than service them and risk financial and criminal penalties. Western Union is considered the largest money remitter in the world and even it has lost accounts with certain banks.

Remitters typically have in-house compliance programs and external reviews of these programs. Banks also have in-house compliance programs and external reviews. However, these two operations are uncoordinated.

It is common for remitters and their agents to collect cash from multiple customers and make one bulk deposit into a financial institution. The remitter then executes a wire through a financial institution to a correspondent remitter who receives one lump sum and then distributes cash to the respective customers' beneficiaries (see FIG. 1).

The financial institution receiving the remitter's bulk deposit and performing the wire does not have access to the details of the remitter's individual customers and cannot identify which customers are sending money, how much they are sending and who is receiving the funds. This makes it difficult for banks to comply with various BSA, Anti-Money Laundering (AML) laws, and the PATRIOT ACT.

Remitters also make their cash deposits on a standard bank deposit slip. A standard deposit slip does not make it possible to identify the source of the cash. In addition, the agent of the remitter typically does not deposit exact amounts creating either a receivable or payable making it further difficult for the bank to understand the activity of the remitter.

Cash—For purposes of this application, cash refers to the physical currency printed on banknotes as well as coins that may be exchanged for goods or services. More specifically, in reference to this patent application, cash refers to any instrument that may be deposited in a traditional commercial bank account for credit in a customer's account.

Bulk Cash—refers to a large quantity of paper money or coins. More specifically, in reference to this patent application, bulk cash refers to the grouping of multiple cash transactions into one amount for a bulk deposit into a financial institution. These deposits of cash may represent one or more transactions on behalf of a third-party and the details of the third-party are often considered to be unknown to the financial institution in which the bulk cash is being deposited.

Deposit Slip—A small written form that is used to deposit funds into a financial institution.

A deposit slip typically indicates the date, the name of the depositor, the depositor's account number and the amounts of checks, cash and coin being deposited. In a traditional deposit slip, the lines that state the words "cash", "coins" and "checks" are there to signify the type of currency being deposited into the account. It is not a reference to the origins of the currency. Cash being deposited into a bank account can be for many reasons including income earned from sales in the ordinary course of business, refunds, customer deposits, investments into a company, additional amounts paid as capital from the owner(s), escrow, etc.

See also U.S. Pat. Nos. 5,978,780; 7,114,649; 7,246,741; 7,881,996; and 7,882,031, as well as US Patent Publication Nos. 2003/0233319; 2005/0038748; 2005/0071268; 2005/0108164; and 2007/0063016.

SUMMARY OF THE INVENTION

In accordance with the illustrative embodiments demonstrating features and advantages of the present invention, there is provided a method performed by a provider for facilitating a bulk deposit to a financial institution based on dealings between a remitter and an agent of the remitter. The method includes the steps downloading from the remitter to the provider, transaction information concerning one or more transactions between the agent and one or more customers of the agent. Another step is storing by the provider, information about a deposit slip having a marking signifying said one or more customers. The deposit slip is suitable for delivery to the financial institution together with bulk cash corresponding to the transaction information. The method also includes the step of making available from the provider to the financial institution at least some of the transaction information including (a) its correlation to the deposit slip, and (b) detail greater than that produced on the deposit slip.

In accordance with another aspect of the invention, a method is provided for accepting bulk cash at a financial institution based on transaction information stored by a provider concerning one or more transactions between an agent of a remitter and one or more customers of the agent. The method includes the step of reviewing at the financial institution a deposit slip having a marking signifying the one or more customers, together with bulk cash corresponding to the transaction information. Another step is downloading at the financial institution from the provider at least some of the transaction information. The step of downloading includes downloading information comprising (a) a correlation to the deposit slip, and (b) detail greater than that produced on the deposit slip. The method also includes the step of analyzing the transaction information at the financial institution to obtain information about the deposit slip that was not originally produced upon the deposit slip.

In accordance with yet another aspect of the invention, a system is provided for facilitating delivery of information about a deposit to a financial institution based on dealings between a remitter and an agent of the remitter. The system includes a primary database operable to store transaction information concerning one or more transactions between the agent and one or more customers of the agent. The system also includes a generator for producing a deposit slip adapted for delivery to the financial institution and having markings signifying (a) the one or more customers, and (b) bulk cash corresponding to the transaction information. Also included is an interface operable to provide to the financial institution from the primary database at least a predetermined portion of the transaction information including (a) its correlation to the deposit slip, and (b) detail greater than that produced on the deposit slip.

In accordance with still yet another aspect of the invention, a deposit slip is provided for depositing bulk cash at a financial institution in connection with one or more customers of an agent. The deposit slip is marked with: (a) a listing of transaction amount for each of said one or more customers of the agent; (b) an amount of bulk cash to be delivered to the financial institution with the deposit slip; and (c) a summary of any discrepancy between the listing of transaction amount and bulk cash being delivered to the financial institution.

This method and system can be used to track bulk cash to its original sources. The system creates a process, implemented by a distinct provider, for connecting a remitter's system to a bank's system in order to provide detailed information about the source of cash a remitter is depositing into a financial institution. The system produces a unique deposit slip that is specifically adapted to the MSB industry. Furthermore, the system creates a process for tracking and understanding the receivable/payable balance of a remitter. In the process, the system organizes the data into a meaningful database for assistance in complying with applicable BSA/AML laws and regulations including the ability to know your customer's customer.

Methods and systems of the foregoing type permit scoring the remitter's activity based on the amount of information provided. The system allows the remitter to upload to a distinct provider, copies of CTR forms required by law for every cash transaction over $10,000. The system also allows for uploading copies of photo ID, which is required for transactions over $3,000. The system allows for data entry for fields such as, but not limited to, name, address, SSN, tax ID number, passport number, bank account number, telephone number and beneficiary name, address and telephone number. Based on the amount of information provided, the system will score the remitter to provide a risk level for the financial institution to use in determining the quality of the clients transactions for AML/BSA compliance risk.

The foregoing allows effective Know Your Customer's Customer (KYCC) policy. The system provides for a user friendly, easily accessible, real time database of the customer activity of the agents of the remitter. This effectively creates the ability for the financial institution to know your customer's customer. By creating a system for generating specific queries about a bulk cash deposit made at a financial institution, the financial institution has the ability to generate knowledge about its customer's customer. This gives the financial institution valuable insight and allows it to comply with the stringent BSA/AML laws of both federal and state agencies.

By employing methods and systems of the foregoing type, an improved technique is achieved for allowing a bulk deposit to be made at a financial institution. The term bulk deposit is intended to refer to multiple cash transactions that are bundled into one transaction and delivered to a financial institution by one individual or entity on behalf of several ostensibly unidentified individuals or entities.

In one embodiment a remitter works with a network of agents, for example, a network of stores or other local outlets that deal directly with customers wishing to send money to a beneficiary. In this situation a customer (the sender) will bring cash or other monetary valuables to an agent who will then access a network to transfer the appropriate information to the remitter, either electronically or by conventional means (telephone, paper, and the like). This transaction information will include, but is not limited to, the amount to be transferred, the customer's name, address and date of birth, as well as, but not limited to, the beneficiary's name and address. The transaction information may also include details on the type of identification provided by the customer.

The present, improved technique allows for a financial institution to implement an effective Know Your Customer (KYC) policy. In order to truly know one's customer, one must know the customer's customer. The process of capturing the information about the bulk deposit takes anonymous information and gives it identity.

The system creates a unique deposit slip for the remitter industry, and provides for a process of bridging between the remitter's system and the bank's system, to create a platform for generating reports that are useful to the financial institution and gives the financial institution the ability to access information about a cash transaction that was previously considered anonymous.

Compliance has become an industry all its own. In this new industry of compliance, financial institutions do not have a system for tracking/determining where cash is coming from when being deposited as a "bulk deposit." This application discloses a unique deposit slip that offers the ability to track the cash in detail and have the bank's customers define where it came from. This assists the financial institution in determining its liability and risks in dealing with certain money remitter clients.

The unique sender ID on the deposit slip will give the bank the ability to determine the specific origins of the cash and its specific purpose. Authorization Number—this feature allow for an authorization process, a process where on a daily basis a person (e.g., the remitter's agent) to get permission to come to the bank and deposit into an account belonging to somebody else (the money remitter).

Over/Under—The traditional system only records exactly what was deposited into the bank. The disclosed deposit slip gives the ability to track a variation between what the agent's customer's activity was and what was actually deposited into the account.

Although it could be done manually in some cases, in the disclosed system, software running at the remitter's office will detect whether the transaction amount exceeds $3,000.00. If so, the agent will be automatically asked to provide additional details about the identification presented by the customer. These details can be uploaded to the provider's system and the provider's system will have the ability to make it available for review by the financial institution's system.

If the transaction amount exceeds $10,000.00 and the agent has not already done so, the agent will be automatically be asked to upload an image of the photo ID presented by the customer. In addition, a blank form will appear on the remitter's monitor. By completing this form, the remitter will have effectively prepared a Currency Transfer Report (CTR) that can be sent electronically or can be printed and mailed to the appropriate authorities. This form can be uploaded to the provider's system and the provider's system will have the ability to make it available for review by the financial institution's system.

In any event, the proposed transaction will be presented on the remitter's monitor for final review. At this time, the customer and the beneficiary can be automatically checked against an OFAC blacklist. Also, to comply with anti-money laundering laws, the remitter can look for structuring schemes, smurphing, etc. If in the end the agent is trusted and the transaction(s) otherwise seems appropriate, the remitter will approve this transaction(s) with the agent and request a deposit slip through the provider's system. An approval screen will be generated for the remitter to acknowledge that the transactions have been reviewed by their compliance system and the transactions meet all appropriate standards and requirements and the transactions are OK to be deposited for transmission to sender's beneficiary.

Eventually, cash collected by the agent from one or more customers will need to be deposited at the remitter's bank or other financial institution. With the disclosed system the remitter may complete a proposed deposit form to send to the agent for depositing currency with the remitter's bank. This form will have the appearance of an ordinary deposit slip with one or more lines, each line having an identification code for a customer and the corresponding transaction amount. This proposed deposit slip will normally be restricted to a single agent and therefore will not list customers unrelated to that agent.

The proposed deposit slip will total all of the transaction amounts. In practice, however, an agent does not always bring in that precise amount. There is a certain amount of rounding and the agent may bring in more or less than the transaction total. Accordingly, the proposed deposit slip will indicate the actual amount of currency to be deposited. In addition, the difference between the actual deposit and the transaction total will be listed on the deposit slip as a discrepancy.

The proposed deposit slip will simultaneously appear on the remitter's monitor for approval. The deposit of an excessive amount of cash may suggest money laundering through the agent. On the other hand, a greatly insufficient cash deposit may suggest misappropriation by the agent. The disclosed system will also give the remitter an opportunity to review the transaction history for this agent. The remitter can make now a judgment as to whether to approve the proposed deposit.

If the deposit is approved, a deposit slip may be printed by the remitter to be delivered to the agent by hand or delivered via email or fax. Information relating to the associated transaction held by the remitter will be made available to the remitter's bank. It will be understood that the remitter may have been accumulating several transactions from this one agent and therefore multiple transactions may be uploaded simultaneously in connection with a single deposit.

When the agent arrives at the remitter's bank with the deposit slip and cash (currency), the bank clerk will verify the deposit slip by accessing the provider's program. In particular, the financial institution will be asked to enter the amount being deposited, which amount has just been physically verified by the financial institution. If the deposit slip is verified, the bank clerk will consider the deposit slip as ordinary and will complete the deposit in the usual manner.

It will be appreciated that in some instances the agent will instead deliver cash to the remitter, who will then physically make the deposit on behalf of the agent using the appropriate deposit slip.

For paperless transactions the deposit slip may simply appear electronically on the monitor for all concerned parties, including the bank.

Once funds have been deposited with the bank, the remitter is now free to instruct the bank to execute a wire transfer to a correspondent bank, either another domestic bank or a foreign bank. The correspondent bank will then credit the account of a remitter's transfer agent that is in a position to facilitate the overall transaction. Often, this correspondent transfer agent will, upon request, provide authorization when a store or outlet is approached by a beneficiary requesting the funds that originated with the customer.

An advantage with the foregoing is that the remitter's bank has comprehensive access to the relevant transaction information. In the past, during regulatory inspection, the remitter's bank would only have a deposit slip for a large amount of cash and would only know the identity of the remitter. Now instead, the bank can examine and display the transaction information sent from the remitter, which is now stored in the provider's database. Therefore if governmental regulators want to make inquiries about large cash transactions, the bank can easily identify its remitter, the agents associated with the remitter, and the customers dealing with those agents. This information can be quite detailed and can include the names and addresses of customers and beneficiaries, information about the form of the customers' identification, images of the identification when appropriate, etc.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 2 illustrates a deposit slip associated with the system of FIG. 1;

FIG. 4 is a screenshot displaying a remitter's daily deposits as stored on one of the databases associated with the system of FIG. 1;

FIG. 5 is a screenshot giving a breakdown of one of the daily deposits from FIG. 4, listing the total deposited for each agent for that day;

FIG. 6 is a screenshot listing the senders, receivers and amounts sent for one of the agents' deposits from FIG. 5;

FIGS. 7A and 7B are screenshots giving the full details of senders and receivers for one of the agents from FIG. 5;

FIG. 8 is a screenshot giving the details of senders sending over $3,000.00 but less than $10,000.00 for one of the deposit dates from FIG. 4;

FIG. 9 is a screenshot giving the details of senders sending over $10,000.00 for one of the deposit dates from FIG. 4;

FIG. 10 is a screenshot to be used by a remitter to select transactions for approval and for creation of a deposit slip;

FIG. 11 is a screen shot of an acknowledgement screen that a remitter must accept to generate the deposit slip; and FIG. 12 is a screenshot used for identifying missing data that a remitter ought go back and add to the transaction information.

DETAILED DESCRIPTION

Figure 1:
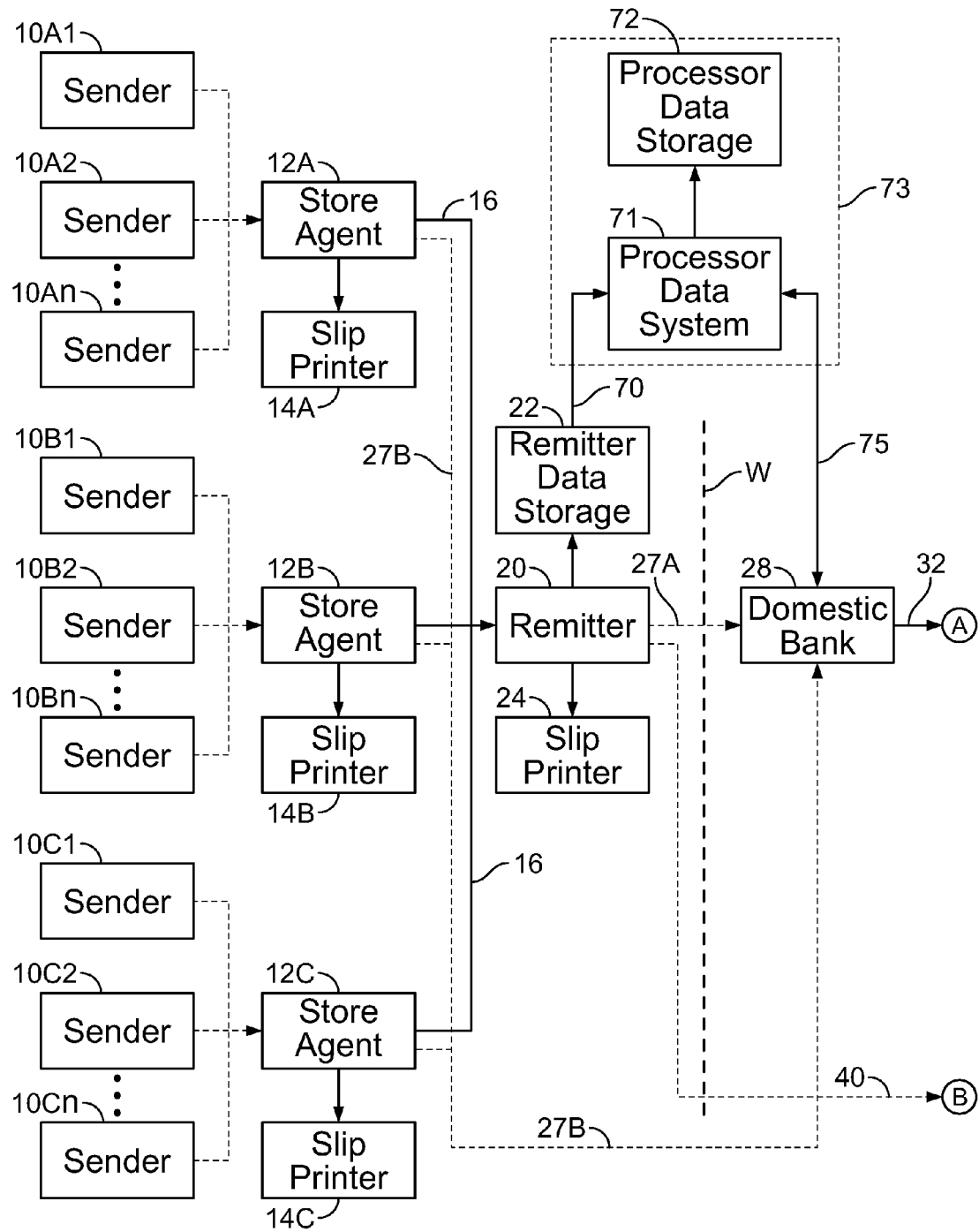
FIG. 1 is a schematic diagram of a system implementing methods and apparatus in accordance with principles of the present invention.
Figure 1:
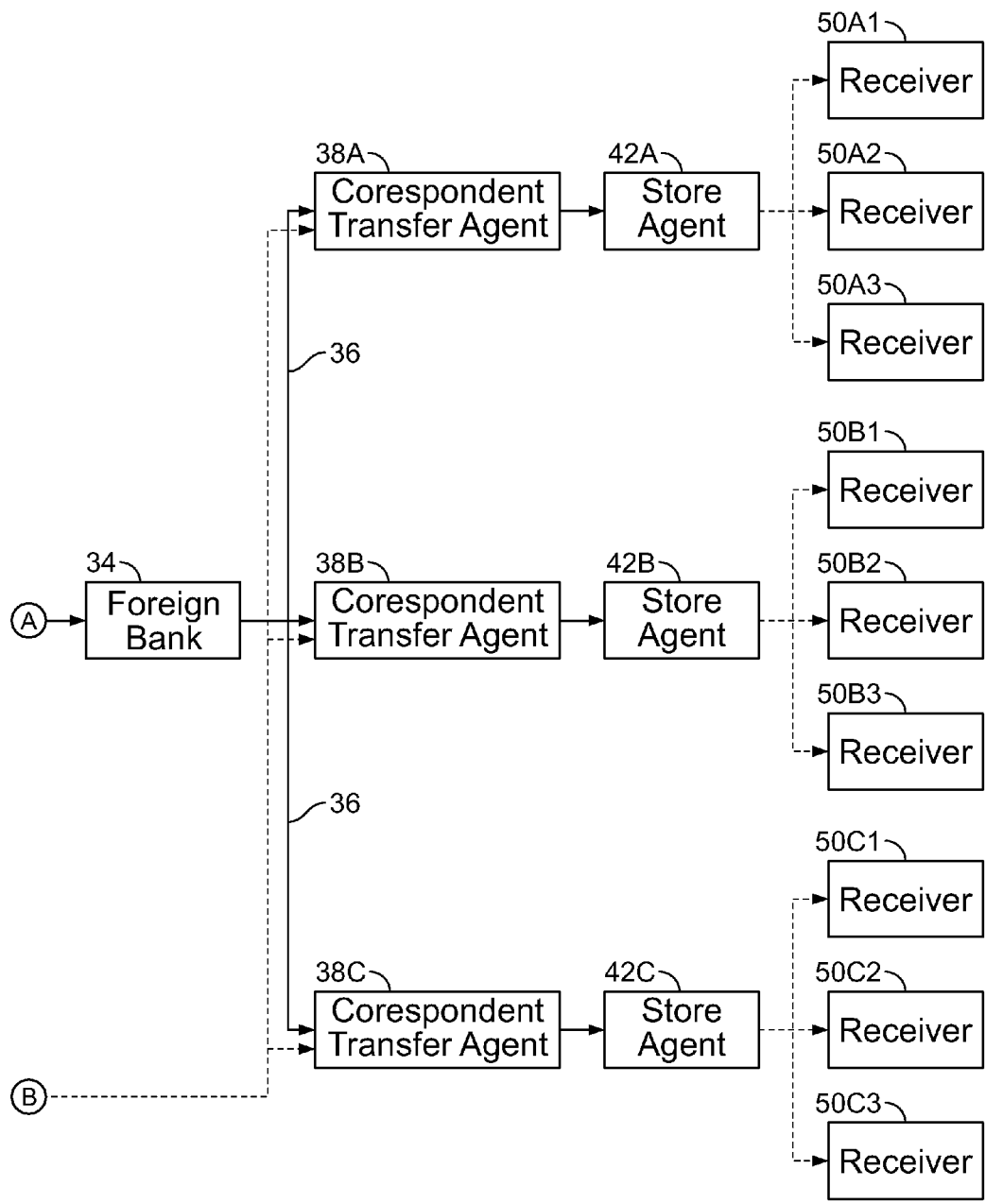

Referring to FIG. 1, this system diagram shows the overall arrangement for transferring money or other monetary benefit from (a) senders 10A1, 10A2, . . . 10An, (these agents can be of any number and are referred to as senders 10A); (b) any number of senders 10B1, 10B2, . . . 10Bn, (referred to as senders 10B); and (c) any number of senders 10C1, 10C2, . . . 10Cn (referred to as senders 10C). Senders 10A, 10B and 10C are referred to collectively as customers 10.

Receivers 50A1, 50A2, 50A3, 50B1, 50B2, 50B3, 50C1, 50C2, and 50C3 are referred to collectively as receivers or beneficiaries 50.

Customers 10A, 10B, and 10C, visit agents 12A, 12B, and 12C, respectively, to initiate a transaction. Agents 12A, 12B, and 12C (collectively referred to as agents 12) may comprise local consumer goods stores offering a money transfer service, and local outlets dedicated to facilitating money transfers. The number of customers 10 and agents 12 can, in general, vary from that illustrated in FIG. 1.

Agents 12 are connected over network 16 to a remitter 20. Network 16 may be implemented by a web based program, a switched telephone network (STN), wireless cellular phone service, cable networks, satellite links, and the like, using an Internet protocol, asynchronous transfer mode technology, etc. Information downloaded by remitter 20 over network 16 into the database in storage device 22 will be encrypted using any one of a variety of known encryption methods, e.g. public-key cryptography.

Agents 12 will have computer-based equipment that may run software applications specifically dedicated to conducting secure communications over network 16 with computer-based equipment operated by remitter 20. Alternatively, agents 12 may simply have an Internet browser that logs into a secure web server operated by remitter 20. In still other cases, agents 12 may communicate by email or simply by telephone or through paper communications.

These and other computer-based equipment may be implemented by software running on autonomous computers or in a distributed computing environment where tasks are performed by remote processing devices that are linked through a communications network. The relevant software applications can operate on a variety of well-known computing systems, such as personal computers, server computers, handheld or laptop devices, multiprocessor systems, microprocessor-based systems, minicomputers, mainframe computers, and the like.

Components of such computers may include a processor and system memory and will typically include a variety of computer readable media, including both volatile and non-volatile media, and removable and non-removable media. Such computers may also use storage media such as RAM, ROM, EEPROM, flash memory or other memory technology, as well as CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. This computer-based equipment will also employ monitors, keyboards, and pointing devices such as a mouse, etc.

The computer-based equipment operated by remitter 20 is shown employing as storage media, hard drive 22, which will contain a database holding transaction information from agents 12, to be used in a manner to be described presently. Also, the computer equipment operated by remitter 20 includes a printer 24. In addition, the computer equipment operated by agents 12A, 12B and 12C will include printers 14A, 14B and 14C, respectively (these printers being collectively referred to as printers 14). Printers 14 and 24 are referred to as generators and will be operable to produce deposit slips, in a manner to be described presently. In some paperless embodiments, the deposit slips will only appear on computer monitors and will therefore be produced as a virtual deposit slip.

Data storage device 22 maintained by remitter 20 can store all information provided by agents 12, together with any relevant information or annotations produced by the remitter.

A service provider 73 is shown having a computer based processor 71 coupled to a data storage device 72 (device 72 containing a primary database). Processor 71 is coupled over network 70 to the remitter's storage device 20 in order to download information therefrom in a database to database transfer (equivalently, one could say remitter 20 uploads information to the database in storage device 72). Network 70 will be an electronic link and may use technology previously described in connection with network 16. While only individual remitter 20 is shown communicating with service provider 73, it will be understood that in practical embodiments, multiple remitters will be coupled to provider 73 to take advantage of the provider's services, which will be described presently.

Remitter 20 is shown connected by link 27A to a financial institution, in this case domestic bank 28. Agents 12 are also shown connected to bank 28 by a different link 27B Link 27A (as well as link 27B) represents any common form of making cash deposits in a financial institution including physical walk-ins, armor car delivery and ACH from another financial institution. Link 27A and 27B may also consist of using any traditional form of requesting a wire including a faxed wire request, a telephone wire request and a web based wire request.

Financial institution 28 can be any one of various types of institutions, such as a bank or non-bank financial institution, as well as: an investment bank; a merchant bank; a securities firm; a commercial bank or trust company; a private banker; a credit union; a thrift institution; a money services business; a foreign bank or foreign financial agency; any organization chartered under the banking laws of any state and subject to the supervision of the bank supervisory authorities of a State; a bank organized under foreign law; a national banking association or corporation; or the like. For the purposes of this specification, a financial institution can also include any individual, a corporation, a partnership, a trust or estate, a joint stock company, an association, a syndicate, joint venture, or other unincorporated organization or group and any entity involved in making, facilitating or receiving an electronic payment or wire transfer.

Bank 28 will have a sophisticated computer-based system for serving its usual business activities. This system will be supplemented with additional software modules for accessing information made available by service provider 73 over network 75 from database 72 of processor 71.

Information available from provider 73 through database 72 will include information from remitter 20 previously sent to the provider's storage device 72 via network 70, thereby making available a database of transaction information uploaded by the remitter. Storage device 72 can be a hard drive dedicated to storing information from the remitter 20 or can be part of a larger storage system used by processor 71 to keep track of information normally stored by a financial institution and a remitter.

Bank 28 will have relationships with corresponding financial institutions for implementing wire transfers. One such financial institution is shown as foreign correspondent bank 34, and typically, additional relationships will exist with other domestic banks or with a variety of other appropriate financial institution, although these other relationships are not shown to simplify this description.

Correspondent bank 34 is shown communicating over network 36 to any one of transfer agents 38A, 38B and 38C (these transfer agents being collectively referred to as transfer agents or recipients 38). While agents 38 are shown as being three in number, in many cases the number will be different. Agents 38 have pre-established accounts with bank 34 that allow remitter 20 to instruct bank 28 to implement wire transfers into the respective accounts of agents 38.

Remitter 20 can use independent communications link 40 to notify affected agents 38 of wire transfers being sent to an agent's account in bank 34. In some cases communications link 40 will be the Internet, although other types of links may be used instead. As described further hereinafter, notices sent over link 40 will include information about the transactions originating from sender-customers 10.

Each transfer agent 38A, 38B and 38C is shown linked to a consummating agent 42A, 42B and 42C, respectively. Although this is shown as a one-to-one relationship, in most practical arrangements, each of the agents 38 will be linked to multiple local consummating agents. These agents 42 (i.e., agents 42A, 42, B and 42C) are similar to previously mentioned agents 12, that is, agents 42 may be a local consumer goods store offering a money transfer service, or a local outlet dedicated to money transfers. Basically, consummating agents 42A, 42B and 42C will disburse funds to beneficiaries 50A, 50B and 50C, respectively.

To facilitate an understanding of the principles associated with the foregoing system, its method of operation will be briefly described. As an illustrative example, one of the customers, customer 10A1, arrives at agent 12A with cash intended to benefit beneficiary 50A3. Customer 10A1 delivers the cash to agent 12A, which will include an appropriate service fee. Agent 12A will examine identification presented by customer 10A1 and record that customer's name, address, telephone number, identification number, as well as the name and address of the intended beneficiary. For larger transactions, agent 12A will make a photocopy of the identification presented by customer 10A1. This process is shown in the flowchart of FIG. 3 as initial step S1.

Figure 3:
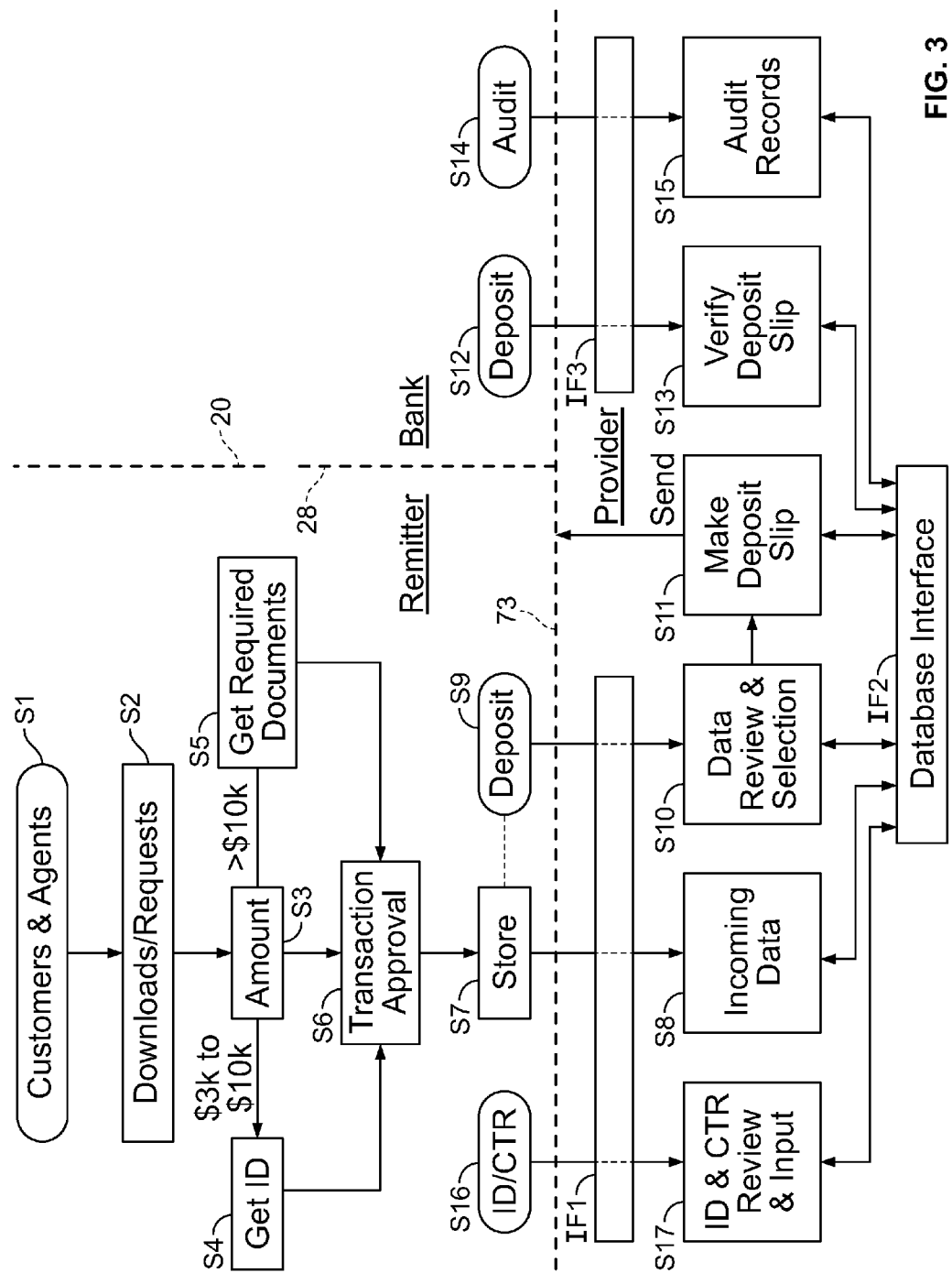
FIG. 3 is a flowchart associated with the system of FIG. 1.

In step S2 of FIG. 3, remitter 20 will download from agent 12A over network 16 (FIG. 1) the transaction information supplied from agent 12A. It is assumed herein that step S2 is part of a computer-based system operated by remitter 20, although some remitters may operate a manual system relying on telephone or paper records. For now, it will be assumed that the download relates to the most recent transaction just described (and not an independent deposit or other request), in which case step S3 will be executed. The download can include not only typed information, but also images of identification presented by customer 10A1.

Next, the monetary amount of the downloaded transaction will be analyzed in step S3. If the transaction exceeds $3,000.00 (but not $10,000.00) step S4 will be executed, where the sufficiency of identification provided by customer 10A1 will be examined by remitter 20. For example, if a driver's license was presented, agent 12A may be required to record the State and possibly the driver license number.

Step S4 may be automatically performed with prompts generated by software running on the computer-based equipment at the office of remitter 20. Alternatively, remitter 20 may simply be expected to examine the transaction information supplied from agent 12A, notice the transaction exceeds $3,000.00, and personally verify that the identification information is sufficient and maintain a copy of the identification presented. If operating an automated system, remitter 20 may be given appropriate warnings at this juncture about the required information.

If the transaction amount exceeds $10,000.00 step S5 will be executed instead of step S4. For this larger transaction remitter 20 must verify agent 12A has obtained an image of the photo ID provided by customer 10A1. This image will be included in the supplied transaction information and, in computer-based systems, will be displayed on a computer screen for inspection by remitter 20. Also, software running at the office of remitter 20 will notify the remitter of the need to complete a Currency Transfer Report (CTR). Remitter 20 can now call up a CTR form with blanks that can be filled out, either manually or automatically. After completing the CTR form, remitter 20 can immediately or later send the form electronically to the appropriate governmental agency, or simply print the form on printer 24 (FIG. 1) for subsequent mailing.

Step S6 of FIG. 3 will be executed either: (1) after satisfying the requirements of step S4 or step S5 (each of these two steps being referred to as diverted activity), or (2) directly without intervening steps S4 or S5, if the transaction amount is determined to be less than $3,000.00 in step S3. In step S6 remitter 20 will have a final opportunity to review the proposed transaction and decide whether to approve it.

At this time remitter 20 will have an opportunity to review prior activity by agent 12A. For computer-based systems, this review can be accomplished by allowing remitter 20 to click on a link (not shown) that will bring up the prior records of agent 12A and related customers of 12A (for purpose of this example, customers 10A1, 10A2, and 10A3). Remitter 20 can examine the reliability of agent 12A, that is, whether prior transactions caused problems, and whether the agent promptly delivered funds to support those transactions. If the history of agent 12A is troubled, remitter 20 may disapprove the transaction. Moreover, even if agent 12A has an unblemished history, remitter 20 may disapprove the transaction because of its size or because of an unusually high frequency of transactions. The proposed transaction can also be disapproved because agent 12A did not provide enough information to satisfy steps S4 or S5.

If the proposed transaction is disapproved control is returned to step S2 to await future downloads from agents 12, or future requests/instructions from remitter 20 or agents 12. If however the transaction is approved, the transaction is stored in step S7 to the remitter's storage device (i.e., the database in device 22 of FIG. 1).

Subsequent to step S7, the remitter 20 may automatically upload the latest transaction to service provider 73 (through processor 71 into the primary database of storage device 72 of FIG. 1). This stored information can be maintained for many years, for example, five years or more. This transfer will be accomplished through interface IF1, employing appropriate handshaking protocols and secure data streams. This transfer is accomplished over network 70 of FIG. 1.

Processor 71 (FIG. 1) of provider 73 will have computer-based equipment to receive this incoming information and, in step S8 (FIG. 3), store the incoming information in storage device 72 of FIG. 1 using the database interface IF2 of FIG. 3. Alternatively, remitter 20 may defer uploading transaction information and may later upload multiple transactions as a batch. In still other cases, independently of remitter 20, provider 73 (FIG. 1) may fetch data from remitter 20 (from storage device 22 of FIG. 1). This fetching may be done on a predetermined schedule or based on a conscious decision made by the provider.

After steps S7 and S8, step S9 can be performed either immediately or be postponed for a more convenient time. Step S9 involves making a deposit and can be initiated by either remitter 20 or one of the agents 12. Whether now or later, agent 12A must eventually seek authorization to make a deposit into the account of remitter 20 (i.e., a deposit into bank 28 of FIG. 1).

If this deposit request is deferred, step S7 returns control to step S2 to await further downloads or instructions. In some cases, a deposit request is deferred by agent 12A until the agent has accumulated funds from a number of customers at which time, agent 12A can request to make a bulk deposit without contemporaneously recording a new transaction, in which case step S9 is accessed peremptorily, bypassing steps S1-S8. In the simplest case, agent submits via email or telephone to remitter 20 a request to receive a deposit slip and permission to bring bulk cash to bank 28 for deposit. In such a case remitter 20 will initiate step S9 instead of agent 12A.

Whenever a deposit request is made, this request will go through a process that is facilitated by a feature implemented by processor 71 (FIG. 1) and shown in FIG. 3 as step S10. As noted, the deposit request may involve only the above described single transaction by agent 12A just approved by remitter 20, or the deposit request might cover several prior transactions from agent 12A.

In step S10 remitter 20 accesses the service provider's program running on processor 71 (FIG. 1) to select specific transactions, either those identified by agent 12A or selected by remitter 20 from among the agent's recent transactions. To implement this selection, remitter 20 will identify agent 12A and in response processor 71 will use interface IF2 to fetch corresponding information from the primary database in storage device 72 in order to present to the remitter the screen shown in FIG. 10. This screen shows all outstanding transactions of agent 12A for which funds have yet to be deposited. In the example of FIG. 10, seventeen transactions (totaling $24,538.36) are listed as outstanding, two from the same sender-customer. Remitter 20 will consider the deposit request from agent 12A, which will usually include an actual deposit amount proposed by the agent.

Frequently, the proposed deposit amount will not precisely correlate with any subset of the outstanding transactions. This disparity may result from rounding the deposit amount, or from deferring some transactions, or from increasing the deposits to account for prior or future deferrals. Remitter 20 will be given the discretion in the screen of FIG. 10 to select less than all of the seventeen display transactions. In this case, remitter 20 has selected eight transactions by clicking the "Yes" column for them. The selection of transactions will be based on an internal set of compliance criteria.

After selecting transactions for deposit from the screen of FIG. 10, processor 71 will prompt the remitter as shown in FIG. 11 to acknowledge having reviewed the transactions and passed the transactions through its internal compliance protocols. If remitter 20 accepts this acknowledgement, the deposit information will be recorded in storage device 72 of FIG. 1, using the database interface IF2 of FIG. 3. As explained further hereinafter, such storage makes the transactions and the deposit information available to the relevant financial institution (bank 28 of FIG. 1) for review and query.

Processor 71 will now continue to step S11 and generate the deposit slip of FIG. 2 and automatically either (a) print it out on the remitter's printer 24 (FIG. 1) for hand delivery to agent 12A; or (b) email it to the remitter 20 for subsequent printing on the agent's printer 14A.

The deposit slip example of FIG. 2 shows the eight transactions previously marked "yes" in FIG. 10 against agent 12A. Markings M1 appearing under the heading "Sender ID #" constitute unique codes signifying customers 10A1, 10A2, 10A3, 10A4, 10A5, 10A6, 10A7, and 10A8 of agent 12A. In this example, customer No. 1136 has two entries, indicating two distinct transactions by that customer. Markings M2 under the heading "Amount" signify transaction amounts associated with each of the markings M1 for customers 10A1-10A8. In this embodiment the deposit slip of FIG. 2 will be dedicated to a single agent, agent 12A, whose identity will be indicated by marking M3 ("1003-WS"), a unique code signifying agent 12A. Accordingly, the listings M1 and M2 will not relate to any other agents.

The eight transaction amounts listed by markings M2 are automatically totaled and displayed as marking M4. While the total represented by marking M4 signifies the amounts actually received by agent 12A, in practice the agent does not always deliver that precise amount. Often the amount delivered is rounded up or down or may include additional funds to accommodate prior deficiencies or expected future deficiencies. The actual amount of bulk cash that will be delivered is designated as marking M5, in this example $25,000.00.

The difference between the amounts of markings M4 and M5 are displayed as marking M6, in this case $461.64. While an excess will be delivered in this case, in other cases the delivered amount M5 may be less than the total M4 and this deficiency will be indicated either by a preceding minus sign or by embracing the difference in parentheses.

Remitter 20 will be able to review the deposit slip of FIG. 2, paying special attention to marking M6, which gives a summary of any discrepancy between (a) the total M4 of transaction amounts M2, and (b) the bulk cash that is to be delivered, indicated by marking M5. If the amount of bulk cash M5 is much less than the transaction total M4, remitter 20 may become concerned that agent 12A is misappropriating funds. If the amount of currency M5 greatly exceeds the transaction total M4, remitter 20 (or financial institution 28) may suspect money laundering. If the deposit seems inappropriate, remitter 20 may refuse future deposit requests until the situation is resolved; or the financial institution 28 may suspend the account until the situation is resolved. At this time remitter 20 or financial institution 28 may need to take appropriate step to bring the agent 12A into compliance and may also need to take steps to notify authorities of perceived unlawful activity.

The deposit slip of FIG. 2 will ultimately be given an authorization code shown as marking M7 after approval. In this example, following step S11 of FIG. 3, the deposit slip of FIG. 2 will upon receipt by remitter 20, be emailed to agent 12A. Agent 12A will print the deposit slip using printer 14A of FIG. 1.

Accordingly, requests for a deposit slip can only be requested by an authorized representative of the agent 12A and completed by the remitter 20.

Once remitter 20 delivers the deposit slip of FIG. 2 via email (or by fax or hand delivery) to agent 12A, the agent is now authorized to bring bulk cash to bank 28 for deposit. When agent 12A brings bulk cash to bank 28, the teller will be trained to access the service provider's program via step S12 and enter the account number (marking M8) and authorization number (marking M7).

The system employed by bank 28 will then connect over network 75 (FIG. 1) to processor 71 of FIG. 1, this connection being indicated in FIG. 3 as step S12, shown negotiating through interface IF3 to execute appropriate handshaking and security features. In succeeding step S13, deposit information corresponding to the identified authorization and account number will be downloaded through database interface IF2. Next, processor 71 (FIG. 1) will request the teller to confirm the amount of bulk cash being deposited into the account of remitter 20. This information will be uploaded to the processor database 72 via network 75 and will be used to create the over/under running balance of the agent 12A.

Accordingly, the over/under amount, described as marking M6 of FIG. 2, will be confirmed at the moment agent 12A delivers cash to the financial institution (bank 28 of FIG. 1). The bank teller will have access to the data stored in storage device 72 by processor 71.

An invalid deposit or deposit slip will be rejected by processor 71, which will then inform the teller of the invalidity of the deposit. If however the deposit is valid, the deposit will proceed as if it were a normal, simple cash deposit. Immediately or sometime later, remitter 20 will confirm that agent 12A has deposited the designated funds with bank 28.

Remitter may at some convenient, arbitrary time initiate step S16, which establishes a connection through interface IF1 over network 70 of FIG. 1. Specifically, in succeeding step S17 processor 71 will fetch data from storage device 72 concerning any transactions for any of the agents 12 (not just agent 12A) that amount to at least $3,000.00. The fetched data will be presented to remitter 20 as shown in the screenshot of FIG. 12. So for this example, the deposit slip of FIG. 2 had only one such transaction, which is reported as the fifth item in the listing of FIG. 12. Accordingly, remitter 20 can identify missing data (FIG. 12) and choose to enter this data. The data requested may be ID's, CTR's and SAR's. The remitter 20 (and as described further hereinafter financial institution 28) will use this data to determine compliance risk levels.

Description will now be made of the ability of financial institution 28 to access information stored by service provider 73. Accordingly, one of the advantages of the system is that financial institution 28 effectively has comprehensive access to the transaction information normally held in the database of storage device 22 operated by remitter 20. In the past, this information was unavailable to financial institution 28 and there existed a virtual wall W between remitter 20 and financial institution 28. With the present system, financial institution 28 can obtain detailed information about the transactions underlying the deposits of remitter 20 by accessing database 72 through processor 71 of service provider 73.

Specifically, in step S14 bank 28 can request information about specific deposits made at the bank via a set a queries conveyed through interface IF3. This request launches step S15 and an associated program module running on processor 71 of FIG. 1. The requested data fields can be, but are not limited to, any set of fields or combination of fields regarding date, amount, agent, agent's teller, street address, town, state or province, zip code, ID type, ID#, beneficiary name, beneficiary address, beneficiary phone number, or beneficiary bank. Financial institution 28 can view the requested fields or request a report. Processor 71 will return a report in limited format about the search.

In step S15 processor 71 generates a report showing fields that can have copious data (FIG. 12). Some fields provide access to copies of ID's for transactions over $3,000, copies of ID's and CTR reports for transactions over $10,000 and copies of SAR reports when filed on suspicious activity and copies of sender ID's when obtained based on a remitter's own compliance criteria.

So for example, the first line (Cristiane Reis) exceeds $3,000.00 but not $10,000.00 and indicates a copy of the sender's ID is held by the remitter and that an electronic copy can be viewed by clicking on the second column following the sender's name. For this transaction remitter 20 also has a copy of a CTR, but has not provided an electronic copy for viewing online. Also, no SAR has been created. If bank 28 believes the foregoing backup information should be supplemented or corrected, the bank can request remitter 20 to respond appropriately.

The last line of FIG. 12 shows a transaction exceeding $10,000.00 but with no sender ID available. A CTR is available only online and an SAR is available at the remitter and online. This transaction appears irregular and bank 28 will need to take corrective action and investigate the nature of this transaction.

In general, financial institution 28 can fetch information from the primary database on storage device 72 using a variety of filtering queries. In the exemplary screenshot of FIG. 4, personnel at financial institution 28 have used the drop-down, editable menus in header 52 to select the account of remitter 20. In this hypothetical example the operator selected only account number 0372723123, although a second account can be selected through the second drop-down menu. The hypothetical date range selected by the next two drop-down menus is from Jun. 15, 2010 to Jun. 25, 2010. The final two drop-down menus specifies a dollar range from zero to maximum. In response, the system provided below in block 54 the requested deposit listing.

The foregoing listing of FIG. 4 will be inadequate for many purposes, especially for audits conducted by regulatory agencies. If additional information is required, an operator can click on one of the deposit items listed in block 54 of FIG. 4. For the purposes of the present explanation, it will be assumed that the operator selected the third item (Jun. 20, 2010) by double-clicking on it, although any of the other items could have been selected instead.

In response, the system at provider 73 executes a different filtering query and provides further details about the deposit of Jun. 20, 2010, as shown in the screenshot of FIG. 5. This screenshot shows the identification code of six different agents (six of the agents 12 of FIG. 1). (The deposit slip of FIG. 2, gives an identification code for a single agent as marking M3.) The screenshot of FIG. 5 also lists for each of the six agents, the amount deposited (compare with marking M5 of FIG. 2), the amount received (compare with marking M4 of FIG. 2), the deposit authorization code from remitter 20 (compare with marking M7 of FIG. 2), and the over/under amount (discrepancy marking M6 of FIG. 2). The two last columns in FIG. 5 (Details and Branch #) will include other information deemed useful by the financial institution.

The foregoing listing of FIG. 5 may still be inadequate for many purposes, especially for investigations of suspicious banking activities. If additional information is required an operator can click on any one of the agents listed in FIG. 5. For the purposes of the present explanation, it will be assumed that the operator selected the last item (Agent 001-MP) by double-clicking on it, although any of the other agents could have been selected instead.

In response, the system at provider 73 executes a different filtering query and provides further details about the deposit by agent 001-MP on Jun. 20, 2010, as shown in the screenshot of FIG. 6. The screenshot shows again the agent's identification code, the deposit authorization code, the amount deposited ($25,000.00), and the amount received ($24,538.36). In this case the amount received originates from seven senders, one of the senders executing two transactions. Specifically, FIG. 6 lists the amount sent (compare with marking M2 of FIG. 2), the name of the sender, and the name of the receiver.

The operator will be given the option of expanding the information presented in FIG. 6 into the full data listing illustrated in FIGS. 7A and 7B. FIG. 7A lists the agent ID (0001-MP), the agent's license number (58583), the invoice number generated for each of the eight transactions listed, the transaction date and time, monetary amount sent (compare with marking M2 of FIG. 2), sender ID (compare with marking M1 of FIG. 2), sender-customer name, sender-customer ID type (driver's license, passport, etc.), sender-customer ID (e.g., driver's license number), sender-customer's date of birth, and the sender-customer's street address, city, state and zip code.

FIG. 7B lists in the first column the sender-customer's telephone number, while the rest of the columns relate to the receiver (beneficiary). The receiver information includes: receiver sys ID (a unique receiver ID code automatically generated by the system at runtime); the receiver's name; receiver ID (a receiver ID code with additional digits useful for encoding additional information about the receiver); the receiver's street address, city, state, and country; the receiver's telephone number; bank name (i.e., bank 34 of FIG. 1); bank branch; and account type and number (for the accounts of agents 38 of FIG. 1).

Often financial institution 28 (FIG. 1) will need information about individual transactions that exceed $3,000.00. Accordingly, an operator at financial institution 28 can execute another filtering query at the database of storage device 72 requesting such information. The results of such a query is shown in FIG. 8 for transactions attributable to remitter 20 on a specific date. These query results do not include transactions exceeding $10,000.00 since those are normally queried separately and require different handling. Basically, the information listed in FIG. 8 is a subset of the information provided in FIGS. 7A and 7B. The operator will be given an opportunity to expand the information of FIG. 8 to provide all of the data provided in FIGS. 7A and 7B.

Often financial institution 28 (FIG. 1) will need information about individual transactions that exceed $10,000.00. Accordingly, an operator at financial institution 28 can execute another filtering query at the database of storage device 72 requesting such information. The results of such a query are shown in FIG. 9 for transactions attributable to remitter 20 on a specific date. As before, the information listed in FIG. 9 is a subset of the information provided in FIGS. 7A and 7B and can be expanded to provide all available data.

It is appreciated that various modifications may be implemented with respect to the above described embodiments. The foregoing steps may be executed in different orders and in some embodiments the system may eliminate some of the steps or include additional steps. Furthermore, the information displayed in FIGS. 4-9 can be altered to include a different amount of information and also provide optional links for executing different procedures or for gathering a variety of information. Also, the illustrated databases can contain information of any type desired by users of this system. The amount of information stored in a database can be more or less than that described above. Some of the steps described for the foregoing system may be paperless and executed electronically, but in some cases individual steps may be performed manually and with paper and pen. The form of the deposit slip can be varied depending upon the amount of information desired on the slip and the requirements of the financial institution accepting the deposit.

Obviously, many modifications and variations of the present invention are possible in light of the above teachings. It is therefore to be understood that within the scope of the appended claims, the invention may be practiced otherwise than as specifically described.

The invention claimed is:

1. A system for facilitating delivery of information about a deposit to a financial institution based on dealings between a remitter and an agent of the remitter, the system comprising:
 a primary database operable to store transaction information concerning one or more transactions between the agent and one or more customers of the agent;
 a generator for producing a deposit slip adapted for delivery to the financial institution and having markings signifying (a) said one or more customers, and (b) bulk cash corresponding to the transaction information; and an interface operable to provide to the financial institution from the primary database at least a predetermined portion of the transaction information including (a) its correlation to the deposit slip, and (b) detail greater than that produced on the deposit slip.

2. A system according to claim 1 wherein said interface is operable at the financial institution to examine the transaction information in order to obtain information about the deposit slip that was not originally produced upon the deposit slip.

3. A system according to claim 1 wherein markings on said deposit slip are restricted to the agent and a listing identifying said one or more customers of the agent without listing another's customers.

4. A system according to claim 1 wherein the primary database is operable to automatically upload from the remitter at least said predetermined portion of the transaction information in response to production of the deposit slip by said generator.

5. A system according to claim 4 wherein the primary database is operable to store for up to five years for said one or more customers: customer name and address, beneficiary name and address.

6. A system according to claim 5 wherein the primary database is operable to store for said one or more customers: customer date of birth, and type of customer identification presented.

7. A system according to claim 5 wherein the primary database is operable to filter and display information based on (a) date, (b) agent, (c) customer, (d) minimum monetary amount, (e) or a combination of the foregoing.

8. A system according to claim 1 wherein said deposit slip is marked with: (a) a listing of transaction amount for each of said one or more customers of the agent, (b) amount of bulk cash to be delivered to the financial institution with the deposit slip, and (c) a summary of any discrepancy between the listing of transaction amount and bulk cash being delivered to the financial institution.

9. A system according to claim 8 wherein the primary database is operable to display at least some of the information proposed for the deposit slip, in order to allow consideration in advance whether said summary of any discrepancy evidences either (a) misappropriation by delivery of inadequate currency, or (b) money laundering by delivery of excess currency.

10. A system according to claim 1 wherein the primary database is operable to apply qualification criteria to the transaction information and respond to failure by sending a request to upload specified information about identification supplied by at least some of said one or more customers.

11. A system according to claim 1 wherein the primary database is operable to apply qualification criteria to the transaction information and respond to failure by sending a request to upload an image of identification supplied by at least some of said one or more customers.

12. A system according to claim 1 wherein the primary database is operable to suspend normal operation (a) when said one or more transactions exceed in total a predetermined monetary amount, and (b) until a currency transaction report is completed online.

* * * * *